Nov. 10, 1953

I. J. ACOSTA 2,658,717

VALVE ACTUATING AND LATCHING MECHANISM

Filed June 25, 1947

Inventor:
Ivan J. Acosta
By: Joseph O. Lange
Atty.

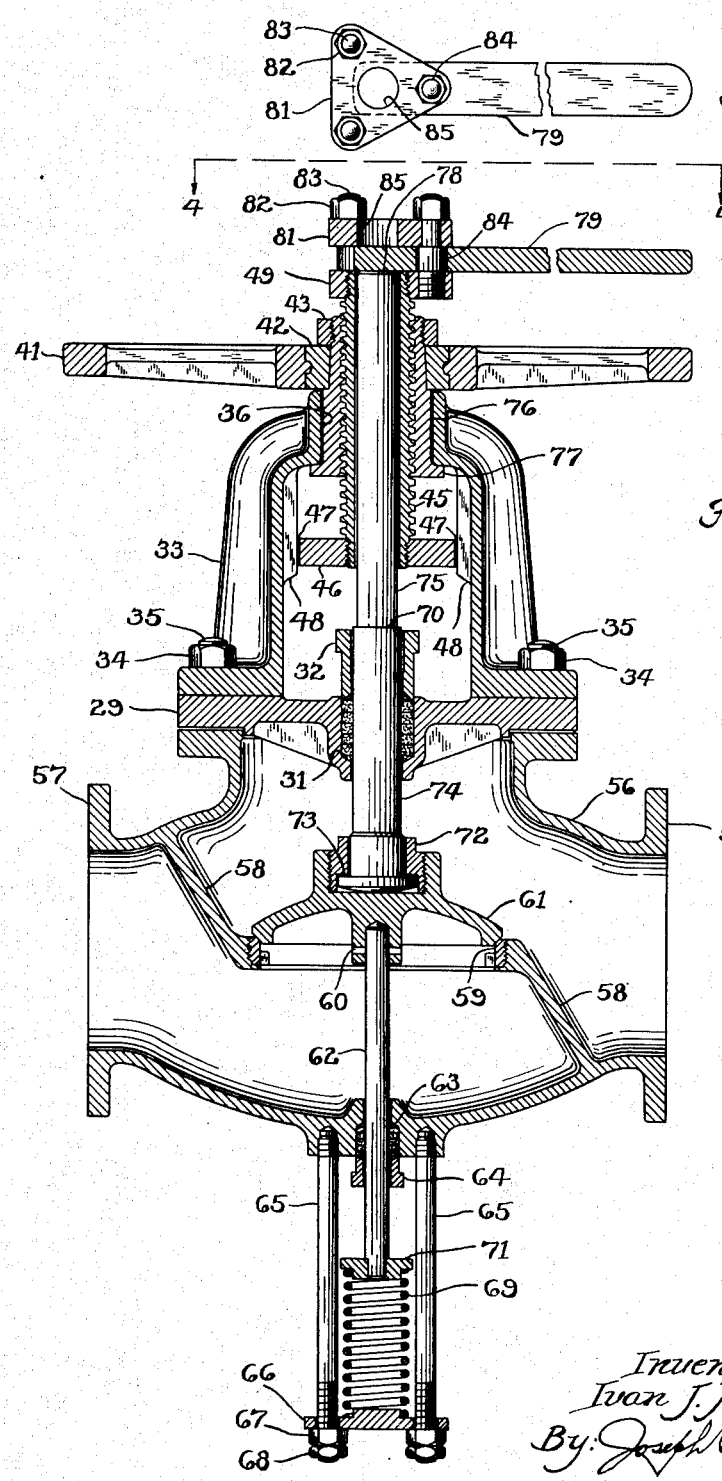

Patented Nov. 10, 1953

2,658,717

UNITED STATES PATENT OFFICE 2,658,717

VALVE ACTUATING AND LATCHING MECHANISM

Ivan J. Acosta, Chicago, Ill., assignor to Crane Co., Chicago, Ill., a corporation of Illinois Application June 25, 1947, Serial No. 756,847

9 Claims. (Cl. 251—164)

1

This invention relates generally to a novel form of actuating mechanism suitable for use on quick opening and slow closing sliding stem globe or angle type valves. More specifically it is concerned with a type of valve in which the latter member can be quickly opened at predetermined times and at the same time permit the valve to be subsequently closed against line pressure by a positive resetting mechanism.

It will be apparent that this construction has application to a wide variety of uses in many unrelated devices in which a similar kind of movement is desired.

In order to have a true appreciation of the application of this invention it should be understood that frequently aboard ship or in certain types of industrial applications particularly under emergency conditions it is desirable that the fluid line upon which the valve is installed be opened without any considerable loss of time and where relatively complicated mechanical or other types of valve actuating mechanisms and latching arrangements will not be acceptable to the user.

Accordingly it is one of the more important objects of this invention to provide a relatively simple means of latching a valve stem or similar actuator whereby the valve can be positively closed and easily opened against line fluid pressure by means of the customary valve stem threads while at the same time the novel structure also permits of unlatching the first named structure so that the valve may be opened quickly.

Another important object is to provide a simple latching mechanism preferably cooperating with the valve stem and working in combination with the threads of a yoke sleeve and the handwheel to permit the valve to be opened quickly by merely uncoupling the latch and releasing the stem while at the same time permitting the valve to be subsequently set or closed tightly against line pressure.

Other important objects and advantages will become more readily apparent upon proceeding with the following description read in light of the accompanying drawings in which:

Fig. 3 is a sectional assembly view of a modified form of valve embodying the invention.

Fig. 4 is a fragmentary plan view showing the latching mechanism employed with Fig. 3 and taken along the line 4—4 of the latter figure.

Similar reference numerals refer to similar parts throughout the several views.

Figures 1, 2:
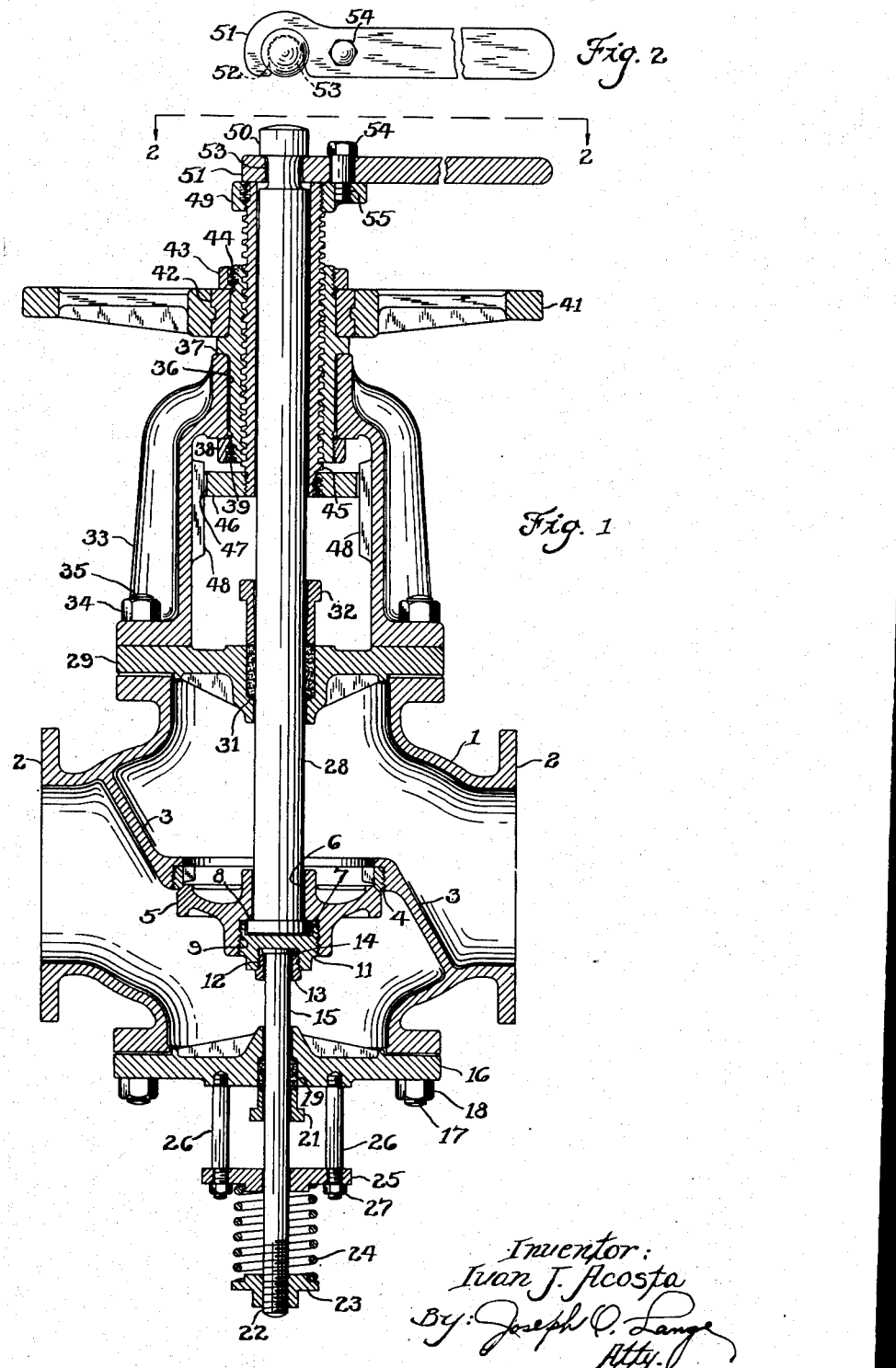
Fig. 1 is a sectional assembly view of a preferred form of a valve embodying my invention.
Fig. 2 is a fragmentary plan view showing the latching mechanism employed in Fig. 1 and taken along the line 2—2 of the latter figure.

Referring now to Fig. 1, the valve assembly consists of the body or casing 1, having the usual end flanges 2 for suitable connection to a pipe line. The latter connection of course may be of any form suitable for connection to the line such as by brazing, welding, threading or otherwise attaching same. The casing is provided with the diaphragm or bridge wall 3, the latter is preferably although not necessarily fitted with the seat ring member 4 threadedly attached thereto as indicated. On the underside of the seat ring 4 a closure member 5 is positioned having the contact when in the closed position with the seat ring 4 as indicated. The valve disc or closure member 5 is provided with a central aperture 6 shouldered as at 7 to receive the stem head 8 and having its lower end portion threaded as at 9 to receive the recessed disc stem ring 11, the latter in turn being threaded as at 12 to receive the shank of the guide ring 13. The disc stem ring 11 is recessed as at 14 to receive the head of the disc guide 15 as indicated. The member 15 functions to assist in the prevention of any substantial side play in the disc as it moves in a reciprocable manner within the casing during the opening and closing movements of the valve. However, under certain conditions such guide mechanism may be dispensed with if desired under stipulated conditions of operation without seriously affecting the operation of the device. The lower portion of the casing 1 is preferably provided with a cover 16 bolted thereto by means of the bolts 17 and nuts 18. To guard against leakage past the guide 15 the conventional stuffing box 19 is provided with the stuffing box gland 21 adjustable for compression by the usual bolts (not shown). At the lower end portion of the guide 15, the threads 22 are used to hold a spring washer 23 in desired position. Supported upon the latter member the coiled spring 24 is placed, bearing at its top portion against the upper spring washer 25, the latter being held in position by means of the spring washer posts 26 threadedly held to the washer by means of a nut 27 and to the cover 16 by the tapping shown. The purpose of the assembly thus far described in connection with the stem guide 15, the spring 24 and washers 23 and 25 is simply to assist in drawing the closure member 5 away from its seat when it has been opened by line pressure which is on the upper side of the disc.

Now continuing with the description of the upper portion of the valve assembly, preferably integral with the stem head 8 is the main stem 28, the latter member as indicated projecting through the bonnet 29 by way of the stuffing box 31 and the gland 32 similarly adjustable for compression as described in connection with the member 21. Superposed upon the bonnet member 29 is the yoke 33, the latter member being bolted to the bonnet 29 by means of the nuts 34 and the threaded studs 35 fastened to the casing 1 as indicated. At the upper end of the yoke 33 a hub portion is provided having the aperture 36 therethrough and within which the yoke sleeve 37 is rotatably mounted, the latter member being shouldered at both ends of the hub to inhibit axial movement of the hub as indicated. At the lower portion of the yoke sleeve a sleeve nut 38 is provided, the latter member being locked in position by means of the set screw 39. To facilitate rotation of the yoke sleeve 37 whenever desired, the handwheel 41 is provided, having the insert piece 42 non-rotatably mounted therebetween upon the yoke sleeve 37, the cross-section of the insert being of polygonal form and snugly fitted on the sleeve. The handwheel 41 is held firmly in place by means of the wheel nut 43, the latter being preferably locked in place by means of the set screw 44.

An important aspect of this invention lies in the construction in which there is threadedly journaled within the yoke sleeve 37 the inner sleeve 45, the latter member being held against rotation by means of the sleeve holder 46 having opposite end recessed portions 47 which engage the similarly disposed ribs 48 of the yoke 33. Thus it should be apparent that upon suitable rotation of the handwheel 41 and the yoke sleeve 37, the non-rotatable inner sleeve 45 is caused to travel axially upon the threads of the inner sleeve 45 in a direction depending upon the rotation of the handwheel and yoke sleeve.

At this stage in connection with the aforesaid movement of the inner sleeve, it will be noted that the stem unlike the usual valve stem is plain or without threads for its entire length. Therefore the only manner in which it can be made to move reciprocably for opening and closing movements of the valve is by means of a novel severable connection with the outwardly threaded inner sleeve 45, the latter member being non-rotatable and reciprocably movable on the threads provided as indicated. At the upper end of the sleeve the sleeve nut 49 is suitably attached in non-rotatable relation. The lever 51 is provided with the open end or hooked portion 52 as more clearly shown in the plan view of Fig. 2. Normally in the closed position of the valve the lower hooked portion engages the reduced portion or neck 53 of the stem 28, the lever 51 being pivotally movable upon the cover cap screw 54 threadedly attached to the sleeve nut by means of the threads 55. Thus with the valve in the closed position it will be apparent that as the handwheel 41 is rotated counter-clockwise thereby rotating the yoke sleeve 37, the inner sleeve 45 moves axially upon the threads of the yoke sleeve and thereby carries with it the stem 28 since the latter member is connected by means of the lever 51 to the end of the yoke sleeve by means of the lever 51 and the sleeve nut 49. In order to close the valve, the handwheel is customarily rotated in a clockwise direction (when looking down upon the valve) and to open the latter the wheel is rotated in a counter-clockwise direction.

Thus assuming the valve to be in a closed position and it becomes necessary because of an emergency to open the valve very quickly, the lever 51 is moved pivotally clockwise upon the screw 54 so that the portion 52 moves out from under the stem upper head 50 and thus the neck portion 53 of the stem 28 is released. The valve closure member will open with the aid of fluid pressure within the valve itself, since the pressure here is on top of the disc and is also aided in opening by means of the spring 24. It should be understood as previously mentioned, that the spring is not essential to the operation of the valve for in many cases line pressure alone is sufficient to open the valve by forcing the closure member from its seat.

With the valve in open position assume that it is now the desire to close the valve. It is first necessary to lower the inner sleeve 45. This is done by rotating the handwheel 41 in a clockwise direction until there has been sufficient axial movement so that enough of the stem as at 50 and 53 is exposed to engage with the relieved portion 52 of the lever 51 when the latter lever has been pivotally moved in a horizontal plane and in a counter-clockwise direction to affect the desired engagement as illustrated. Next the valve is actually closed by simply turning the handwheel 41 in the desired direction so as to raise the sleeve 45 until the closure member 5 is tight on the seat 4.

Thus it will be apparent that a simple but yet effective method of construction has been devised whereby the valve may be opened quickly in the event of an emergency as for an example in the event of its use on a fire line or chamber flooding system. At the same time after the emergency has passed the valve can be made to close tightly upon the seat by the usual thread operating mechanism employed in a conventional valve.

The construction is also applicable to valves in which the fluid pressure is below the disc or closure member, and for example, referring now to the modified form shown in Figs. 3 and 4, the casing 56 as similarly described in connection with Fig. 1 is provided with the connecting end flanges 57 and with the diaphragm or bridge walls 58 providing a support for the seat ring 59 which in turn likewise supports the closure member 61. The latter member is preferably provided with the guide extension 62 held as at 60 in the closure member, and projecting through the stuffing box 63 of the casing, the stuffing box being suitably compressed by means of the gland flange 64. Suitably attached into the lower portion of the body 56 are the spring washer posts 65, while at the lower portion of the latter is a spring washer 66 threadedly held in position by means of the nut 67 and lock nut 68 to support the coiled spring 69 and maintain the latter in predetermined compressed condition, the spring member bearing against the upper spring washer 71. It will thus become apparent that with the spring 69 under compression it will tend to draw the main disc 61 away from its seat and this is particularly aided since the line fluid pressure is normally applied under the disc in the construction herein illustrated.

The upper portion of the main disc 61 is provided similarly with a disc stem ring 72 threadedly attached as indicated to the said closure member and bearing against the stem head 73 of the main stem 74, the latter member extending through the bonnet 29 by way of the stuffing box 31 and past the gland 32 in the same manner as described in connection with the construction illustrated in Fig. 1. Preferably the upper portion of the stem 74 may be reduced in diameter as indicated at 75 and thus form the shoulder 70, the reduced portion extending within the inner sleeve 45 as shown. The inner sleeve is non-rotatably held in position by the sleeve holder 46 engaging the yoke ribs 48 by means of the recessed ends 47. As described in connection with Fig. 1 the yoke 33 being similar in construction to that described in connection with Fig. 1 is attached to the bonnet in the same manner as described in connection with the latter figure.

However, the latching means at the upper portion of the yoke for holding the stem in predetermined fixed position axially is different as will hereinafter become apparent. The yoke sleeve 76 is journaled for rotation within the hub aperture 36 of the yoke 33 and while an integral flange is shown at 77 it may be made with a separate member as indicated in Fig. 1. At the upper portion of the yoke sleeve, the latter member is provided with the polygonal cross-section fitting the handwheel 41 having the insert 42 and the wheel-nut 43 as shown. The upper end portion of the stem however is made with a plain flat end as at 78 instead of being provided with the recessed or neck portion 53 as shown in Fig. 1. Transversely extending across the tip of the flat end of the stem 74 is the pivotally mounted lever 79 mounted upon the sleeve nut 49 and having at its upper end the apertured plate 81 held by means of the bolt and studs 82 and 83 respectively to the sleeve nut 49 with the lever 79 therebetween. One of the said attaching means for the plate apertured at 85, serves as the pivoting point for the lever 79 as indicated at 84. The method of operation of the stem holding mechanism does not differ substantially from the latching means described in connection with Figs. 1 and 2. Assuming the valve to be in the closed position illustrated and it is desired to open it quickly, the pivotally mounted lever 79 is moved in either direction so as to thereby permit the valve to open and allow the end of the stem as at 78 to project upwardly past the displaced lever 79 and through the aperture 85 of the plate 81. In the last described position the shouldered portion 70 of the stem bears against the sleeve holder 46. To place the stem in the position in which it will be contained within the sleeve 45 it is simply necessary to rotate the handwheel 41 and the yoke sleeve 76 so as to thereby move the inner sleeve 45 and the sleeve holder 46 upwardly and when the end surface 78 of the stem is flush with the top surface of the sleeve nut 49 the lever 79 is moved pivotally back to the position shown in Fig. 4. The handwheel 41 is then rotated in a clockwise direction to force the stem 75 against the action of fluid pressure to positively close the valve, the thrust in closing being taken by the lever 79 similar to that described in Fig. 1. Thus it is apparent that the valve can easily be closed with a minimum of effort and also opened quickly in the event of an emergency arising.

It is of course obvious that numerous changes may be made in the details of construction and it is the desire therefore to be limited only by the scope of the appended claims.

I claim:

1. In a valve construction of the character described, a closure member, a reciprocably movable actuating stem cooperating with the said closure member, a rotatably mounted yoke sleeve, the said yoke sleeve being mounted for non-axial movement, an inner sleeve reciprocably movable within the said yoke sleeve and having means coacting between the inner sleeve and yoke sleeve to provide reciprocating movement, the said stem being slidably mounted in said inner sleeve, means for inhibiting rotation of said inner sleeve, means for rotating said yoke sleeve to thereby reciprocate said inner sleeve, stem latching means mounted on the said inner sleeve, the said stem latching means being engageable with an end portion of the said stem and transversely movable out of the path of stem movement and upon predetermined movement of said latching means out of the path of stem movement, the stem is axially movable relative to the said inner sleeve.

2. In a latching mechanism for a valve or the like, the combination including actuating means comprising a yoke, a yoke sleeve rotatably mounted within the said yoke and having an inner threaded portion, the said yoke sleeve being mounted for non-axial movement, an inner sleeve threadedly engaged with said yoke sleeve, means for maintaining said inner sleeve non-rotatable relative to said yoke whereby upon rotation of the said yoke sleeve the said inner sleeve is axially movable relative to the said yoke sleeve, a longitudinally movable stem slidably mounted within the said inner sleeve, latching means mounted on the said inner sleeve adapted to engage the said stem, the said stem when engaged by the said latching means being movable axially together with the said inner sleeve upon rotation of the said yoke sleeve, the said latching means being mounted for movement into positive engagement with said stem and out of the path of stem movement whereby upon release of said latching means the said stem is rendered axially movable independently relative to the said inner sleeve.

3. In a valve construction of the character described, a bonnet, a closure member, a reciprocably movable actuating stem supporting the said closure member, resilient means cooperating with the said closure member to aid in the stem positioning of the latter member, a rotatably mounted yoke sleeve mounted for non-axial movement relative to the said bonnet and having an inner threaded portion, a second sleeve threaded to engage with said yoke sleeve and non-rotatably mounted for reciprocable movement relative to the said yoke sleeve, latching means on the inner sleeve to axially secure said stem against predetermined movement, the said latching means being mounted for movement into positive engagement with said stem and out of the path of stem movement whereby upon said engagement of the stem by the said latching means the said closure member is movable in a closing direction by predetermined rotation and axial movement of the threaded inner sleeve relative to the rotatable yoke sleeve and whereby the said stem upon movement of the said latching means out of the path of stem movement is axially movable relative to the said threaded inner sleeve.

4. In a valve latching mechanism, the combination comprising a valve housing having a flow passage and a valve seat formed in said flow passage, a reciprocably movable closure member cooperating with said valve seat to control the flow through said passage, actuating means for the said closure member including an unthreaded stem axially movable with the said closure member, a yoke for supporting the said actuating means, a yoke sleeve rotatably mounted within said yoke for non-axial movement, an inner sleeve within said yoke sleeve and within which the said unthreaded stem is mounted for slidable movement, the said inner sleeve being rotatably and threadedly engaged with said yoke sleeve to provide predetermined reciprocating movement therebetween, means for maintaining said inner sleeve non-rotatable relative to said yoke and thereby axially movable thereto upon rotation of said yoke sleeve, pivotally mounted latching means supported upon the said inner sleeve, the said pivotally mounted means engaging the said stem in predetermined axial position of the latter member to inhibit axial movement of the stem, the said latching means allowing upon predetermined transverse movement out of the path of stem movement for the projection of the said stem beyond the said latching means thereby to facilitate quick opening of the valve.

5. In latching means for a valve construction, the combination including a casing therefor, a sleeve on said casing for support of the said latching means and having an external threaded portion, means for non-rotatably maintaining said sleeve, a stem member for the said casing engageable predeterminately by the said latching means, guide means on the said casing for the said stem member, resilient means adjacent the guide means cooperating with the said stem member, actuating means for the said stem member, said latter means including a rotatably mounted yoke sleeve having internal threads for engagement with said first-named sleeve and rotatable relative thereto, means for maintaining said yoke sleeve axially immovable with said casing, said stem member being axialy movable relative to the yoke sleeve and slidably mounted in said first-named sleeve, said latching means cooperating with an apertured portion of the said inner sleeve to positively engage the said stem in axially predetermined fixed position, the said latching means being mounted for movement into positive engagement with said stem member and out of the path of stem member movement, the said resilient means cooperating with the said stem member to assist in axially displacing the said stem member upon said movement of the latching means out of the path of stem member movement.

6. In a stem positioning and positive closing valve actuating mechanism, the said mechanism including axially movable guide means therefor, an unthreaded stem longitudinally movable with the said guide means, a yoke having a hub portion, a yoke sleeve rotatably mounted within the hub portion for non-axial movement relative to the said yoke and having a threaded inner portion, an externally threaded inner sleeve threadedly engaged within the said yoke sleeve, means for non-rotatably maintaining said inner sleeve relative to said yoke, the said stem being slidably mounted within the said inner sleeve, pivotally mounted latching means cooperating with the inner sleeve and transversely movable relative to an end portion of said stem, the said latching means cooperating with the said stem in a predetermined position of the latter member to permit release of same for predetermined axial movement, the latching means having engaging means cooperating with the stem upon axial movement of the inner sleeve and transverse movement of said latching means to engage said stem and thereby move the said stem to desired axial position upon predetermined rotation of the said yoke sleeve.

7. The combination of a latching mechanism for a valve or the like, actuating means comprising a yoke, an axially movable stem, a yoke sleeve rotatably mounted for non-axial movement within the said yoke and having an internal threaded portion, an axially movable inner sleeve engageable with the said yoke to prevent rotation of the inner sleeve, the said stem being mounted for sliding movement in said inner sleeve, the said inner sleeve being outwardly threaded to be receivable within the yoke sleeve, an actuating means for the said yoke sleeve, whereby upon rotation of the actuating means for the said yoke sleeve the said inner sleeve is caused to move axially relative to the said yoke sleeve, latching means inhibiting axial movement of the said stem upon predetermined axial movement of the said inner sleeve, the latching means being mounted on the said inner sleeve and being disengageable with an end portion of the stem to allow unlatching of the said stem, a lower end surface portion of the said inner sleeve cooperating with a shouldered portion of the stem upon predetermined rotation of the said yoke sleeve in the latched positioning of the said stem.

8. In a valve actuating construction, a casing, a closure member for the said casing, means cooperating with the said closure member in positioning the latter member reciprocably relative to the said casing, including an unthreaded stem reciprocably movable in the casing, a yoke for supporting the said stem, a rotatably mounted internally threaded yoke sleeve mounted for non-axial movement within said yoke, an inner sleeve non-rotatably mounted with respect to the casing within the said yoke sleeve and having external threads for engaging said yoke sleeve threads, latching means at one end portion of the said inner sleeve mounted for transverse movement into positive engagement with said unthreaded stem and out of the path of stem movement, said non-rotatable mounting comprising means slidably engageable with said yoke to prevent rotation of the inner sleeve, means for rotating the said yoke sleeve whereby the inner sleeve is axially movable, whereby release of the latching means from its engagement with the said stem upon effecting said transverse movement of the latching means relative to the said inner sleeve away from the central axis of the said unthreaded stem permits the free axial movement of said unthreaded stem.

9. In a combined valve actuating and latching mechanism or the like, supporting means for the said mechanism, the said mechanism including an axially movable unthreaded stem, an internally threaded yoke sleeve rotatably mounted within said supporting means and held axially immovable relative to the said supporting means, a threaded inner sleeve non-rotatably mounted and axially movable within said yoke sleeve to engage the threads thereon, latching means supported by the said inner sleeve and mounted for transverse movement relative to the said stem in predetermined axial position of the said inner sleeve member, the said stem being slidably mounted in said threaded inner sleeve, the said threaded inner sleeve in the unlatched position of the said latching means permitting the said stem to move freely axially and upon transverse movement of the latching means in an opposite direction the said inner sleeve means engages the stem whereby upon suitable rotation of the said yoke sleeve the said inner sleeve cooperates with the stem to move the latter member and said inner sleeve together to a predetermined stem axial position.

IVAN J. ACOSTA.

References Cited in the file of this patent

UNITED STATES PATENTS

| Number | Name | Date |
|---|---|---|
| 608,197 | Harrison | Aug. 2, 1898 |
| 900,260 | Boyd | Oct. 6, 1908 |
| 960,872 | Fischer | June 7, 1910 |